United States Patent
Han et al.

(10) Patent No.: US 12,524,657 B2
(45) Date of Patent: Jan. 13, 2026

(54) AI ACCELERATOR, CACHE MEMORY AND METHOD OF OPERATING CACHE MEMORY USING THE SAME

(71) Applicant: ELECTRONICS AND TELECOMMUNICATIONS RESEARCH INSTITUTE, Daejeon (KR)

(72) Inventors: Jin-Ho Han, Seoul (KR); Young-Su Kwon, Daejeon (KR); Mi-Young Lee, Daejeon (KR); Joo-Hyun Lee, Daejeon (KR); Yong-Cheol Cho, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 1059 days.

(21) Appl. No.: 17/544,224

(22) Filed: Dec. 7, 2021

(65) Prior Publication Data
US 2022/0180162 A1    Jun. 9, 2022

(30) Foreign Application Priority Data

Dec. 8, 2020    (KR) .................. 10-2020-0170742
Nov. 18, 2021   (KR) .................. 10-2021-0159733

(51) Int. Cl.
  *G06N 3/063*    (2023.01)
(52) U.S. Cl.
  CPC .................... *G06N 3/063* (2013.01)
(58) Field of Classification Search
  None
  See application file for complete search history.

(56) References Cited

U.S. PATENT DOCUMENTS

| | | | |
|---|---|---|---|
| 5,574,877 A | 11/1996 | Dixit et al. | |
| 5,875,464 A | 2/1999 | Kirk | |
| 6,661,534 B1 * | 12/2003 | Ravi ............... | G06K 15/18 |
| | | | 358/1.9 |
| 9,354,944 B2 | 5/2016 | Gaster et al. | |
| 10,025,364 B2 | 7/2018 | Kim | |
| 10,282,328 B2 | 5/2019 | Lee | |

(Continued)

FOREIGN PATENT DOCUMENTS

| KR | 10-2017-0102720 | 9/2017 |
|---|---|---|
| KR | 10-2018-0050883 | 5/2018 |

(Continued)

OTHER PUBLICATIONS

Zhao Xia et al: "Adaptive memory-side last-level GPU caching", Proceedings of the 2020 CHI Conference on Human Factors in Computing Systems, ACMPUB27, New York, NY, USA, Jun. 22, 2019, pp. 411-423.

(Continued)

*Primary Examiner* — Yaima Rigol
(74) *Attorney, Agent, or Firm* — KILE PARK REED & HOUTTEMAN PLLC

(57) ABSTRACT

Disclosed herein is an AI accelerator. The AI accelerator includes processors, each performing a deep-learning operation using multiple threads; and a cache memory including an L0 instruction cache for providing instructions to the processors and an L1 cache mapped to the multiple areas of mapped memory.

16 Claims, 4 Drawing Sheets

(56) References Cited

U.S. PATENT DOCUMENTS

| | | | |
|---|---|---|---|
| 2006/0004942 A1 | 1/2006 | Hetherington et al. | |
| 2007/0174586 A1* | 7/2007 | Tell | H04L 7/02 |
| | | | 712/1 |
| 2016/0070658 A1 | 3/2016 | Woolley | |
| 2016/0371196 A1 | 12/2016 | Koh | |
| 2017/0255554 A1 | 9/2017 | Han et al. | |
| 2018/0239702 A1* | 8/2018 | Farmahini Farahani | |
| | | | G06F 12/0813 |
| 2018/0307624 A1 | 10/2018 | Zmora et al. | |
| 2019/0114534 A1 | 4/2019 | Teng et al. | |
| 2019/0206090 A1* | 7/2019 | Ray | G06T 15/005 |
| 2019/0286563 A1 | 9/2019 | Swamy et al. | |
| 2021/0374210 A1 | 12/2021 | Gu et al. | |
| 2021/0406342 A1* | 12/2021 | Majcher | G06F 9/3001 |

FOREIGN PATENT DOCUMENTS

| | | |
|---|---|---|
| KR | 10-2018-0136237 | 12/2018 |
| KR | 10-2020-0062323 | 6/2020 |
| KR | 10-2020-0070088 | 6/2020 |
| WO | 01/75607 A2 | 10/2001 |

OTHER PUBLICATIONS

Su Xing et al: "SCP: Shared Cache Partitioning for High-Performance Gemm", ACM Transactions on Architecture and Code Optimization, Association for Computing Machinery, US, vol. 15, No. 4, Oct. 10, 2018, pp. 1-21.

* cited by examiner

AI ACCELERATOR, CACHE MEMORY AND METHOD OF OPERATING CACHE MEMORY USING THE SAME

CROSS REFERENCE TO RELATED APPLICATIONS

This application claims the benefit of Korean Patent Application No. 10-2020-0170742, filed Dec. 8, 2020, and No. 10-2021-0159733, filed Nov. 18, 2021, which are hereby incorporated by reference in their entireties into this application.

BACKGROUND OF THE INVENTION

1. Technical Field

The present invention relates generally to an Artificial Intelligence (AI) accelerator and a cache memory therefor, and more particularly to a cache structure having high operation efficiency and high degrees of parallel operation for multiple processor cores for accelerating deep learning.

2. Description of the Related Art

When designing a deep-learning accelerator, efforts to include a large number of operators and caches in the limited area of a single chip have been made in order to improve operation efficiency. Particularly, approaches for improving operation performance have been made by reducing the number of accesses to external memory. In one of such approaches, heterogenous cores specializing in deep-learning acceleration are integrated in a chip, and coding for parallel operation of the heterogenous cores is performed using a framework such as Open Computing Language (OpenCL) or the like.

Particularly, OpenCL manages memory areas separately by dividing the same into private, local, and global memory areas, so efficient access to data in these memory areas is an important factor for improving operation performance and operation efficiency.

Accordingly, what is urgently required is new cache memory technology capable of maximizing parallel performance with limited memory capacity when multiple processor cores are integrated in a chip.

SUMMARY OF THE INVENTION

An object of the present invention is to maximize the operation efficiency and extent of parallel operation of an AI accelerator having limited memory capacity.

Another object of the present invention is to provide an efficient cache memory having high degrees of parallel operation for multiple processors (processor cores) for deep-learning acceleration, each of which includes a GEneral Matrix Multiplication (GEMM) operator.

In order to accomplish the above objects, an AI accelerator according to the present invention includes processors, each performing a deep-learning operation using multiple threads; and a cache memory, including an L0 instruction cache for providing instructions to the processors and an L1 cache mapped to multiple areas of mapped memory.

Here, each of the processors may include a processor core and a GEneral Matrix Multiplication (GEMM) operator.

Here, the GEMM operator may include multiple GEneral Matrix Multiplication-Arithmetic Logic Units (GEMM-ALUs).

Here, the multiple areas may include a common area shared by the processors and a private area corresponding to some of the threads of each of the processors. Here, the common area may include an instruction area, a metadata area, a local area, and a global area.

Here, the L0 instruction cache and the L1 cache may be configured with multiple cache banks.

Here, the L0 instruction cache may correspond to cache banks of the L1 cache corresponding to the instruction area.

Here, the address of at least one of the instruction area, the metadata area, the local area, the global area, and the private area may vary depending on the type of an operation that is performed.

Here, the number of cache banks corresponding to at least one of the instruction area, the metadata area, the local area, the global area, and the private area may vary depending on the type of the operation.

Here, the L0 instruction cache may include multiple cache banks, each corresponding to a respective one of the threads.

Here, the cache memory may be connected with the processors via an instruction bus, a metadata bus, a private bus, a local bus, and a global bus.

Here, the instruction bus may be connected to an instruction port of the processor core, the metadata bus and the private bus may be connected to a load port of an Arithmetic Logic Unit (ALU) in the processor core, the private bus and the local bus may be connected to a store port of the ALU in the processor core, and the local bus and the global bus may be connected to input ports of the GEMM-ALUs.

Here, the instruction bus may be connected to the L0 instruction cache, the metadata bus may be connected to cache banks corresponding to the metadata area, among the cache banks in the L1 cache, the private bus may be connected to cache banks corresponding to the private area, among the cache banks in the L1 cache, the local bus may be connected to cache banks corresponding to the local area, among the cache banks in the L1 cache, and the global bus may be connected to cache banks corresponding to the global area, among the cache banks in the L1 cache.

Also, a cache memory according to an embodiment of the present invention includes an L0 instruction cache for providing instructions to processors for performing a deep-learning operation; and an L1 cache mapped to multiple areas of mapped memory.

Here, the multiple areas may include a common area shared by the processors and a private area corresponding to some of threads of each of the processors. Here, the common area may include an instruction area, a metadata area, a local area, and a global area.

Here, the L0 instruction cache and the L1 cache may be configured with multiple cache banks, and the L0 instruction cache may correspond to cache banks of the L1 cache, corresponding to the instruction area.

Here, the address of at least one of the instruction area, the metadata area, the local area, the global area, and the private area may vary depending on a type of an operation that is performed.

Here, the number of cache banks corresponding to at least one of the instruction area, the metadata area, the local area, the global area, and the private area may vary depending on the type of the operation.

Here, the L0 instruction cache may include multiple cache banks corresponding to respective threads, and the cache memory may be connected with the processors via an instruction bus, a metadata bus, a private bus, a local bus, and a global bus.

Also, a method for operating a cache memory according to an embodiment of the present invention includes setting multiple areas of mapped memory; mapping the multiple areas to cache banks in an L1 cache; and performing, by multiple processors, a deep-learning operation using a cache memory, including the L1 cache and an L0 instruction cache mapped to an instruction area of the L1 cache via a bus.

Here, the multiple areas may include a common area shared by the processors and a private area corresponding to some of threads of each of the processors. Here, the common area may include an instruction area, a metadata area, a local area, and a global area.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
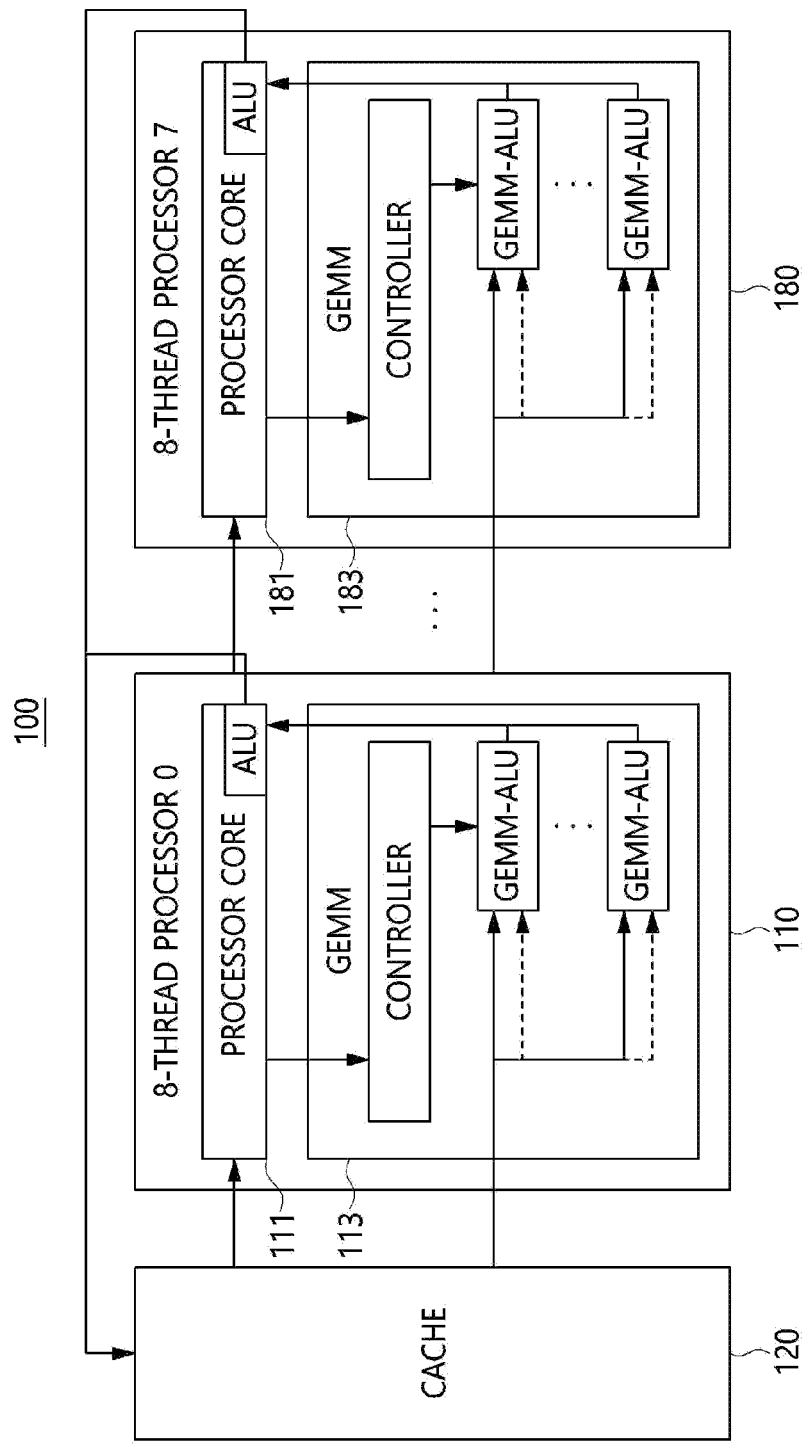
FIG. 1 is a block diagram illustrating an AI accelerator according to an embodiment of the present invention.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a block diagram illustrating an AI accelerator according to an embodiment of the present invention.

Referring to FIG. 1, the AI accelerator 100 according to an embodiment of the present invention includes a cache memory 120 and multiple processors 110, . . . , 180.

Each of the processors 110, . . . , 180 performs a deep-learning operation using multiple threads.

The cache memory 120 includes an L0 instruction cache for providing instructions to the processors 110, . . . , 180 and an L1 cache mapped to multiple areas of mapped memory.

The processors 110, . . . , 180 perform a deep-learning operation by reading data from the cache memory 120 or writing data thereto, thereby operating more efficiently than when directly reading data from DRAM or the like or directly writing data thereto.

Although the case in which the AI accelerator 100 includes eight processors 110, . . . , 180 is illustrated in the example in FIG. 1, the AI accelerator 100 may include more than eight processors or fewer than eight processors.

Here, each of the processors 110, . . . , 180 may execute multiple threads. For example, each of the processors 110, . . . , 180 may execute eight threads.

The processor 110 includes a processor core 111 and a GEneral Matrix Multiplication (GEMM) operator 113.

Here, the GEMM operator 113 may include multiple GEneral Matrix Multiplication-Arithmetic Logic Units (GEMM-ALUs).

Here, the processor core 111 of the processor 110 may access the cache memory 120 in order to read an instruction, the Arithmetic Logic Unit (ALU) of the processor core 111 of the processor 110 may access the cache memory 120 in order to read or write data using load/store instructions, or the GEMM operator 113 of the processor 110 may access the cache memory 120 in order to provide the multiple GEMM-ALUs with two inputs to be used for operation.

Likewise, the processor 180 includes a processor core 181 and a GEneral Matrix Multiplication (GEMM) operator 183.

Here, the GEMM operator 183 may include multiple GEneral Matrix Multiplication-Arithmetic Logic Units (GEMM-ALUs).

Here, the processor core 181 of the processor 180 may access the cache memory 120 in order to read an instruction, the Arithmetic Logic Unit (ALU) of the processor core 181 of the processor 180 may access the cache memory 120 in order to read or write data using load/store instructions, or the GEMM operator 183 of the processor 180 may access the cache memory 120 in order to provide the multiple GEMM-ALUs with two inputs to be used for operation.

For example, when the eight processors 110, . . . , 180 use the cache memory 120, the cache memory 120 may need, at a minimum, a total of 8 instruction ports, 8 load/store ports, and 16 data ports.

Here, the multiple areas mapped to the L1 cache may include a common area shared by the processors 110, . . . , 180 and private areas corresponding to some of the threads of each of the processors 110, . . . , 180. Here, the common area may include an instruction area, a metadata area, a local area, and a global area.

Figure 2:
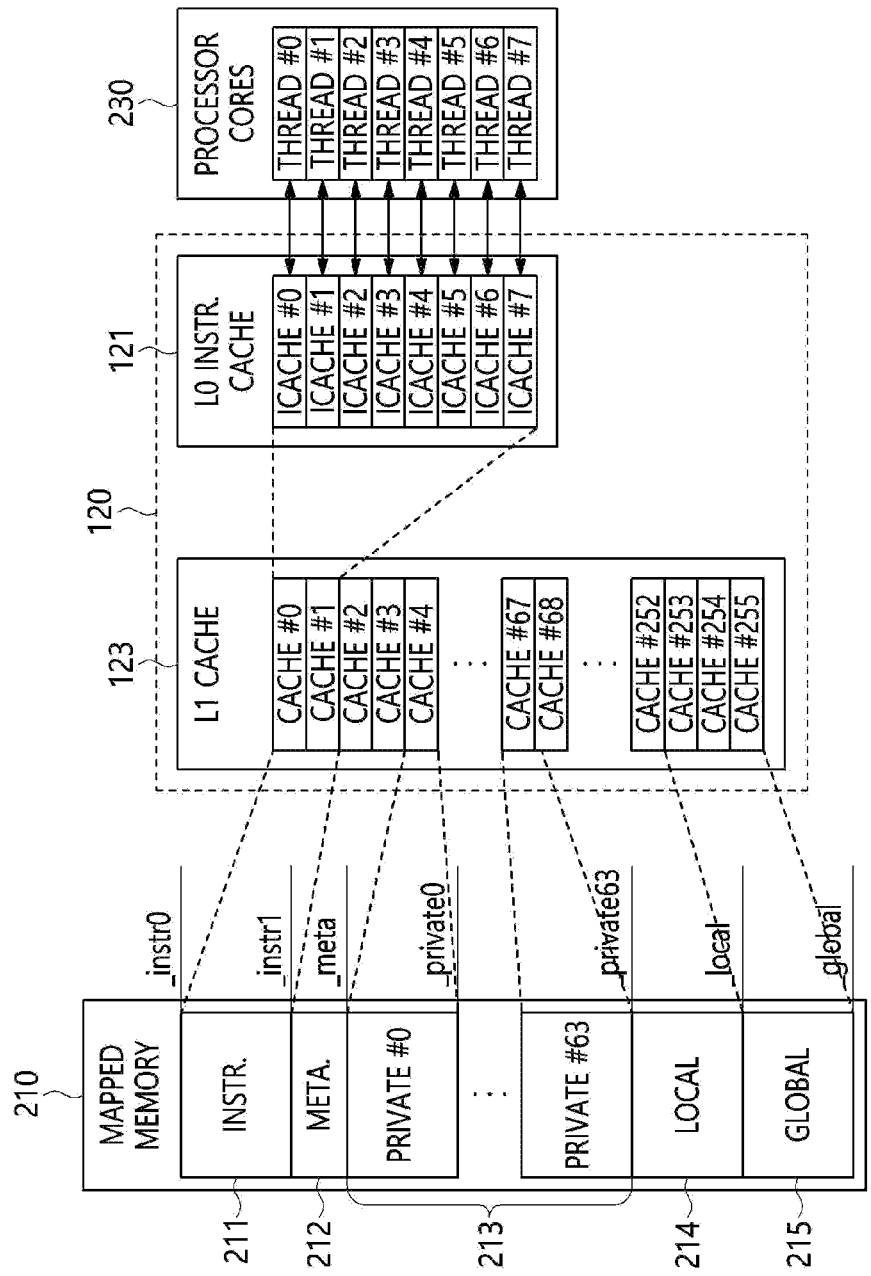
FIG. 2 is a block diagram illustrating an example of the cache memory illustrated in FIG. 1.

FIG. 2 is a block diagram illustrating an example of the cache memory illustrated in FIG. 1.

Referring to FIG. 2, the cache memory 120 includes an L0 instruction cache 121 and an L1 cache 123.

The L0 instruction cache 121 is used to provide instructions to processors, and may include multiple cache banks ICACHE #0 to ICACHE #7. Here, the multiple cache banks ICACHE #0 to ICACHE #7 may correspond to multiple threads THREAD #0 to THREAD #7 in processor cores 230.

The L1 cache 123 may be mapped to the multiple areas of the mapped memory 210.

The multiple areas may include an instruction area 211, a metadata area 212, a local area 214, a global area 215, and private areas 213, as described above.

For example, the mapped memory may be mapped using a memory map, and may correspond to Dynamic Random-Access Memory (DRAM).

In the example illustrated in FIG. 2, the instruction area 211, the metadata area 212, the local area 214, and the global area 215 of the mapped memory may be shared by the eight processors. Here, the private areas 213 may respectively correspond to the eight threads of each of the eight processor cores. Here, the private areas 213 correspond to a combination of the eight processor cores and the eight threads, so there may be a total of 64 areas.

Here, the instruction area 211, the metadata area 212, the local area 214, the global area 215, and the private areas 213 illustrated in FIG. 2 may be set using the addresses of _instr0, _instr1, _meta, _private0 to _private63, _local, and _global, as illustrated in FIG. 2, and these addresses may be variously set depending on the type of deep-learning operation performed by the AI accelerator. That is, the address of at least one of the instruction area 211, the metadata area 212, the local area 214, the global area 215, and the private areas 213 may vary depending on the type of operation that is performed. Further, when the sizes of the multiple areas change due to changes in the above-mentioned addresses, the number of cache banks, assigned to the respective areas, in the cache memory may be changed.

An embodiment of the present invention configures a cache memory to have two levels and flexibly sets a memory map in order to efficiently configure the connection relationship between the cache memory and multiple processors. Accordingly, the size of the cache responsible for each area may vary.

Each of the L0 instruction cache 121 and the L1 cache 123 illustrated in FIG. 2 may be configured with multiple cache banks.

For example, each of the cache banks may have a size of 32 KB, and may have an individual cache controller.

As in the example illustrated in FIG. 2, the L0 instruction cache 121 may correspond to the cache banks CACHE #0 and CACHE #1 of the L1 cache 123 corresponding to the instruction area 211.

In the example illustrated in FIG. 2, the L0 instruction cache 121 may include eight cache banks ICACHE #0, . . . , ICACHE #7 respectively corresponding to the eight threads THREAD #0, . . . , THREAD #7 of the processor cores 230. When the L0 instruction cache 121 is configured with eight individual cache banks and when the eight individual cache banks are shared among specific threads in the eight processors, as described above, the miss rate of the cache may be decreased.

For example, the L1 cache 123 may be configured with 256 cache banks CACHE #0 to CACHE #255. Here, the area of the mapped memory to be assigned to each of the cache banks may be variably set. That is, the cache banks in the L1 cache 123, which are responsible for the areas {_instr1-_instr0}, {_meta-_instr1}, {_private[63~1]-_private0}, {_local-_private[63-1]}, and {_global-local}, and the number of cache banks may vary depending on the sizes of the areas {_instr1-_instr0}, {_meta-_instr1}, {_private[63~1]-_private0}, {_local-_private[63-1]}, and {_global-_local}. That is, the number of cache banks corresponding to at least one of the instruction area 211, the metadata area 212, the local area 214, the global area 215, and the private areas 213 may vary depending on the type of operation that is performed.

Table 1 below shows an example of mapping of the multiple areas to the cache banks in the L1 cache 123, as illustrated in FIG. 2.

TABLE 1

| AREA ADDRESS | ASSIGNED CACHE |
|---|---|
| _instr0~_nstrl | CACHE #0~#1 |
| _instrl~_meta | CACHE #2~#3 |
| _private0~_private63 | CACHE #4~#67 |
| _private63~_local | CACHE #68~#252 |
| _local~_global | CACHE #253~#255 |

In order to reduce the number of ports between the multiple processors and the cache memory and to ensure efficient operation, a bus may be used. In an embodiment of the present invention, the cache memory may be connected with the processors via an instruction bus, a metadata bus, a private bus, a local bus, and a global bus.

Table 2 below shows an example of the connection relationship between processor ports and buses.

TABLE 2

| PROCESSOR PORT | ASSIGNED BUS |
|---|---|
| INSTRUCTION PORT | INSTRUCTION BUS (IB) |
| LOAD PORT | METADATA BUS (MB), PRIVATE BUS (PB) |
| STORE PORT | PRIVATE BUS (PB), LOCAL BUS (LB) |
| GEMM INPUT PORT #1 | LOCAL BUS (LB), GLOBAL BUS (GB) |
| GEMM INPUT PORT #2 | LOCAL BUS (LB), GLOBAL BUS (GB) |

In the example of Table 2, the instruction bus (IB) is connected to the instruction ports of the processor cores, the metadata bus (MB) and the private bus (PB) are connected to the load ports of the Arithmetic Logic Units (ALUs) in the processor cores, the private bus (PB) and the local bus (LB) are connected to the store ports of the ALUs in the processor cores, and the local bus (LB) and the global bus (GB) are connected to the input ports of the GEMM-ALUs. Here, the instruction bus (IB) may be connected to the L0 instruction cache, the metadata bus (MB) may be connected to the cache banks corresponding to the metadata area, among the cache banks in the L1 cache, the private bus (PB) may be connected to the cache banks corresponding to the private area, among the cache banks in the L1 cache, the local bus (LB)

may be connected to the cache banks corresponding to the local area, among the cache banks in the L1 cache, and the global bus (GB) may be connected to the cache banks corresponding to the global area, among the cache banks in the L1 cache.

That is, the instruction bus may be connected to the instruction ports of the eight processor cores, and may be connected so as to access a corresponding thread cache bank of the L0 instruction cache depending on the thread ID.

That is, the metadata bus may be connected to the load ports of the eight processor cores, and may be connected to the cache banks corresponding to the metadata area, among the 256 cache banks in the L1 cache.

That is, the private bus may be connected to the load/store ports of the eight processor cores, and may be connected to the cache banks corresponding to the private area, among the 256 cache banks in the L1 cache.

That is, the local bus may be connected to the store ports of the eight processor cores and to the eight first input ports and the eight second input ports of the respective GEMMs (GEMM-ALUs), and may be connected to the cache banks corresponding to the local area, among the 256 cache banks in the L1 cache.

That is, the global bus may be connected to the eight first input ports and the eight second input ports of the respective GEMMs (GEMM-ALUs), and may be connected to the cache banks corresponding to the global area, among the 256 cache banks in the L1 cache.

As such, when the respective buses are fully connected to a total of 264 (8+256) individual cache banks in the L0 instruction cache and the L1 cache, the bus operation frequency is unavoidably decreased. Therefore, the 264 cache banks are designed to contain a limited number of instruction/metadata/private/local/global areas, and among them, only some necessary cache banks are connected to the buses, whereby the complexity of the bus may be reduced and sufficient communication bandwidth between the cache memory and the processors may be secured.

Figure 3:
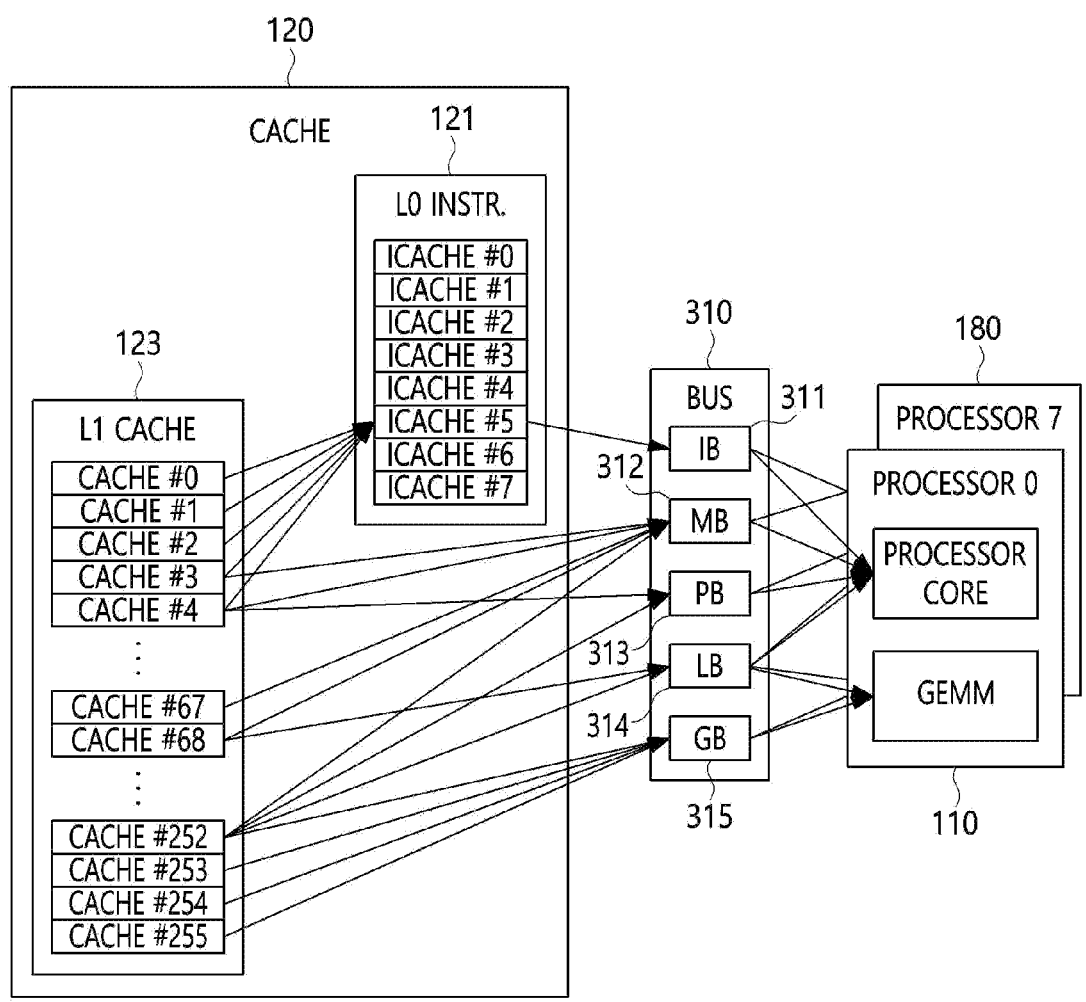
FIG. 3 is a block diagram illustrating the connection relationship between a cache memory and multiple processors via a bus according to an embodiment of the present invention.

FIG. 3 is a block diagram illustrating the connection relationship between a cache memory and multiple processors via a bus according to an embodiment of the present invention.

Referring to FIG. 3, a cache memory 120 is connected with multiple processors 110, . . . , 180 via a bus 310, and the bus 310 includes an instruction bus 311, a metadata bus 312, a private bus 313, a local bus 314, and a global bus 315.

An L0 instruction cache 121 is connected with processor cores via the instruction bus 311, and cache banks in an L1 cache 123 are appropriately connected with the processor cores or GEMM operators via the metadata bus 312, the private bus 313, the local bus 314, and the global bus 315.

According to the cache memory structure and the bus in an embodiment of the present invention, multiple processors for deep-learning acceleration, including GEMM operators, may efficiently perform parallel operations.

Particularly, the present invention provides efficiency in a multi-core and multi-GEMM environment and enables a limited cache to efficiently operate in the situation in which private/local/global memory areas defined in OpenCL and instruction/metadata areas are arbitrarily changed.

Furthermore, according to the present invention, inefficient operation of a cache arising from thread switching in a multi-thread environment may be prevented.

Figure 4:
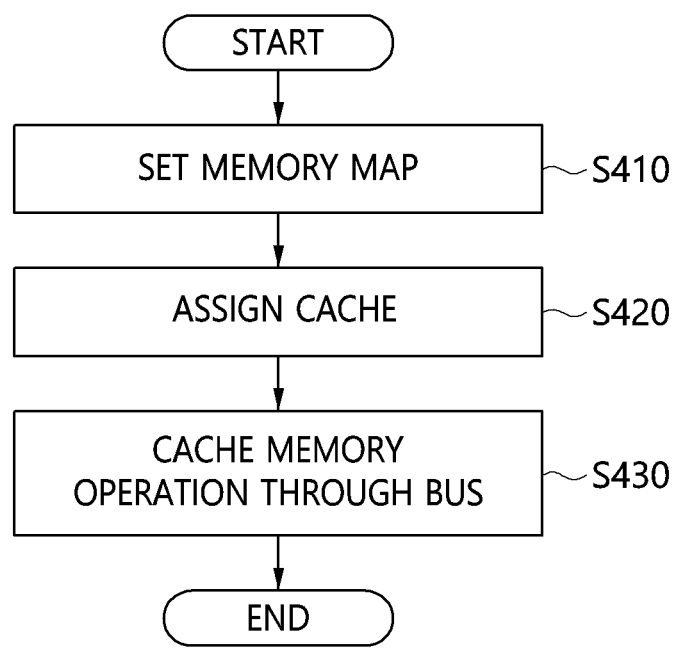
FIG. 4 is a flowchart illustrating an example of a cache memory operation method according to an embodiment of the present invention.

FIG. 4 is a flowchart illustrating an example of a method for operating a cache memory according to an embodiment of the present invention.

Referring to FIG. 4, in the method for operating a cache memory according to an embodiment of the present invention, multiple areas of mapped memory are set at step S410.

Here, the multiple areas may include a common area shared by processors and a private area corresponding to some of respective threads of the processors. Here, the common area may include an instruction area, a metadata area, a local area, and a global area.

Also, in the method for operating a cache memory according to an embodiment of the present invention, the multiple areas are mapped to cache banks in an L1 cache at step S420.

Also, in the method for operating a cache memory according to an embodiment of the present invention, the multiple processors perform a deep-learning operation using a cache memory including the L1 cache and an L0 instruction cache mapped to the instruction area of the L1 cache via a bus at step S430.

According to the present invention, the operation efficiency and extent of parallel operation of an AI accelerator may be maximized with a limited memory capacity.

Also, according to the present invention, an efficient cache memory having high degrees of parallel operation may be provided for multiple processors (processor cores) for deep-learning acceleration, each of which includes a GEneral Matrix Multiplication (GEMM) operator.

As described above, the AI accelerator, the cache memory, and the method for operating the cache memory using the same according to the present invention are not limitedly applied to the configurations and operations of the above-described embodiments, but all or some of the embodiments may be selectively combined and configured, so that the embodiments may be modified in various ways.

What is claimed is:

1. An Artificial Intelligence (AI) accelerator, comprising:
processors, each performing a deep-learning operation using multiple threads;
a cache memory, including a Level 0 (L0) instruction cache configured to provide instructions to the processors; and a Level 1 (L1) cache, the L1 cache mapped to multiple areas of mapped memory,
wherein:
each of the processors includes a processor core and a GEneral Matrix Multiplication (GEMM) operator,
the cache memory is connected with the processors via an instruction bus, a metadata bus, a private bus, a local bus, and a global bus,
the metadata bus and the private bus are connected to a load port of an Arithmetic Logic Unit (ALU) in the processor core,
the private bus and the local bus are connected to a store port of the ALU in the processor core,
the GEMM operator includes GEneral Matrix Multiplication-Arithmetic Logic Units (GEMM-ALUs),
the instruction bus is connected to an instruction port of the processor core, and
the local bus and the global bus are connected to input ports of the GEMM-ALUs.

2. The AI accelerator of claim 1, wherein:
the multiple areas include a common area shared by the processors and a private area corresponding to part of the threads of each of the processors, and
the common area includes an instruction area, a metadata area, a local area, and a global area.

3. The AI accelerator of claim 2, wherein:
the L0 instruction cache and the L1 cache are configured with multiple cache banks.

4. The AI accelerator of claim 3, wherein:
the L0 instruction cache corresponds to cache banks of the L1 cache corresponding to the instruction area.

5. The AI accelerator of claim 3, wherein:
an address of at least one of the instruction area, the metadata area, the local area, the global area, and the private area varies depending on a type of an operation that is performed.

6. The AI accelerator of claim 5, wherein:
a number of cache banks corresponding to at least one of the instruction area, the metadata area, the local area, the global area, and the private area varies depending on the type of the operation.

7. The AI accelerator of claim 1, wherein:
the L0 instruction cache includes multiple cache banks, each corresponding to a respective one of the threads.

8. The AI accelerator of claim 1, wherein:
the instruction bus is connected to the L0 instruction cache,
the metadata bus is connected to cache banks corresponding to the metadata area, among the cache banks in the L1 cache,
the private bus is connected to cache banks corresponding to the private area, among the cache banks in the L1 cache,
the local bus is connected to cache banks corresponding to the local area, among the cache banks in the L1 second cache, and
the global bus is connected to cache banks corresponding to the global area, among the cache banks in the L1 cache.

9. A cache memory, comprising:
a Level 0 (L0) instruction cache configured to provide instructions to processors for performing a deep-learning operation; and
a Level 1 (L1) cache configured to be mapped to multiple areas of mapped memory,
wherein:
each of the processors includes a processor core and a GEneral Matrix Multiplication (GEMM) operator,
the cache memory is connected with the processors via an instruction bus, a metadata bus, a private bus, a local bus, and a global bus,
the metadata bus and the private bus are connected to a load port of an Arithmetic Logic Unit (ALU) in the processor core,
the private bus and the local bus are connected to a store port of the ALU in the processor core,
the instruction bus is connected to an instruction port of the processor core, and
the local bus and the global bus are connected to input ports of GEneral Matrix Multiplication-Arithmetic Logic Units (GEMM-ALUs) of the GEMM operator.

10. The cache memory of claim 9, wherein:
the multiple areas include a common area shared by the processors and a private area corresponding to part of threads of each of the processors, and
the common area includes an instruction area, a metadata area, a local area, and a global area.

11. The cache memory of claim 10, wherein:
the L0 instruction cache and the L1 cache are configured with multiple cache banks, and
the L0 instruction cache corresponds to cache banks of the L1 cache, corresponding to the instruction area.

12. The cache memory of claim 11, wherein:
an address of at least one of the instruction area, the metadata area, the local area, the global area, and the private area varies depending on a type of an operation that is performed.

13. The cache memory of claim 12, wherein:
a number of cache banks corresponding to at least one of the instruction area, the metadata area, the local area, the global area, and the private area varies depending on the type of the operation.

14. The cache memory of claim 9, wherein:
the L0 instruction cache includes multiple cache banks corresponding to respective threads, and
the cache memory is connected with the processors via an instruction bus, a metadata bus, a private bus, a local bus, and a global bus.

15. A method for operating a cache memory, comprising:
setting multiple areas of mapped memory;
mapping the multiple areas to cache banks in a Level 1 (L1) cache; and
performing, by multiple processors, a deep-learning operation using the cache memory, including the L1 cache and a Level 0 (L0) instruction cache, the L0 instruction cache mapped to an instruction area of the L1 cache via a bus, the L0 instruction cache providing instructions to the processors for performing a deep-learning operation,
wherein:
each of the processors includes a processor core and a GEneral Matrix Multiplication (GEMM) operator,
the cache memory is connected with the processors via an instruction bus, a metadata bus, a private bus, a local bus, and a global bus,
the metadata bus and the private bus are connected to a load port of an Arithmetic Logic Unit (ALU) in the processor core,
the private bus and the local bus are connected to a store port of the ALU in the processor core,
the instruction bus is connected to an instruction port of the processor core, and
the local bus and the global bus are connected to input ports of GEneral Matrix Multiplication-Arithmetic Logic Units (GEMM-ALUs) of the GEMM operator.

16. The method of claim 15, wherein:
the multiple areas include a common area shared by the processors and a private area corresponding to part of threads of each of the processors, and
the common area includes an instruction area, a metadata area, a local area, and a global area.

* * * * *